(12) United States Patent
Pasternak et al.

(10) Patent No.: US 7,385,759 B2
(45) Date of Patent: Jun. 10, 2008

(54) OPTICAL SYSTEM WITH VARIABLE POINTING AND METHOD IMPLEMENTING SUCH A SYSTEM

(75) Inventors: Frédérick Pasternak, Gaure (FR); Frédéric Safa, Toulouse (FR)

(73) Assignee: Eads Astrium SAS, Toulouse Cedex (FR)

( * ) Notice: Subject to any disclaimer, the term of this patent is extended or adjusted under 35 U.S.C. 154(b) by 303 days.

(21) Appl. No.: 11/245,461

(22) Filed: Oct. 5, 2005

(65) Prior Publication Data
US 2006/0103925 A1  May 18, 2006

(30) Foreign Application Priority Data
Oct. 7, 2004  (FR) ................... 04 10602

(51) Int. Cl.
*G02B 23/00*  (2006.01)
(52) U.S. Cl. ............. 359/429; 359/399; 250/203.1; 250/203.6
(58) Field of Classification Search .............. None
See application file for complete search history.

(56) References Cited

U.S. PATENT DOCUMENTS

| | | | |
|---|---|---|---|
| 2,923,202 A * | 2/1960 | Trimble | 359/728 |
| 4,159,419 A | 6/1979 | Wittke | |
| 5,108,168 A * | 4/1992 | Norbert et al. | 359/419 |
| 5,773,813 A | 6/1998 | Duchon et al. | |
| 5,828,447 A | 10/1998 | Duchon et al. | |
| 2005/0036198 A1 | 2/2005 | Safa | |

FOREIGN PATENT DOCUMENTS

GB  2 344 951 A  6/2000

OTHER PUBLICATIONS

French International Search Report FR 0410602; report dated May 12, 2005.

* cited by examiner

*Primary Examiner*—Stephone B. Allen
*Assistant Examiner*—Derek S Chapel
(74) *Attorney, Agent, or Firm*—Miller, Matthias & Hull

(57) ABSTRACT

An optical system including a telescope and a principal pointing device for selecting a direction of observation is disclosed. The system furthermore includes at least one secondary pointing device arranged ahead of a part of the entrance of the telescope and oriented fixedly with respect to the principal pointing device. A set of photodetectors records a secondary image formed by the telescope from light rays directed by the secondary pointing device toward the entrance of the telescope The secondary image makes it possible to accurately determine the direction of observation.

18 Claims, 4 Drawing Sheets

OPTICAL SYSTEM WITH VARIABLE POINTING AND METHOD IMPLEMENTING SUCH A SYSTEM

BACKGROUND OF THE INVENTION

The present invention relates to an optical system with variable pointing, as well as to a method implementing such a system.

Identifying the direction of observation of an optical system is necessary in numerous applications, such as, for example, mapping of the sky, terrestrial observation performed from a satellite, especially for meteorological study purposes, the establishing of an optical transmission link with a satellite, etc.

Devices for identifying the direction of observation of an optical system already exist. French patent applications 2 713 785 and 2 724 013 disclose such devices which comprise a light source and a detector associated with the latter. In these devices, a light signal moves over the detector as a function of the orientation of the observation system. These devices are complex, especially on account of the light source which requires a suitable energy supply, and on account of further optical elements that they incorporate. They are also bulky, in particular since they are external to the observation system. Finally, with these devices, variations in the relative positions of the light source and/or the light detector on the one hand, and of the observation system on the other hand, cause errors in the determination of the direction of observation. Such variations in position are due, in particular, to deformations or to thermal expansions of the supports of the detector, of the light source and/or of the observation system.

An aim of the present invention is to make possible determining the direction of observation of an optical system precisely and accurately, while not requiring any complex or bulky equipment.

SUMMARY OF THE INVENTION

To this end, the invention proposes an optical system with variable pointing which comprises a telescope and a principal pointing device making it possible to select light rays originating from a particular direction of observation to enter the telescope. The principal pointing device comprises a principal mirror arranged ahead of the entrance of the telescope and orientable, the direction of observation being selected by orienting the principal pointing mirror so as to reflect light rays originating from the direction of observation toward the entrance of the telescope. The system also comprises at least one secondary pointing device arranged ahead of a part of the entrance of the telescope and oriented fixedly with respect to the principal pointing device. The secondary pointing device is furthermore oriented so that rays directed by the latter toward the entrance of the telescope originate from a direction distinct from the direction of observation. The system also comprises at least one set of photodetectors arranged so as to record an image formed by at least a part of the telescope from light rays directed by the secondary pointing device toward the entrance of the telescope.

The secondary pointing device is rigidly coupled to the principal pointing mirror so as to follow this latter during a change in the direction of observation.

In an optical system according to the invention, the light rays directed by the secondary pointing device toward the entrance of the telescope form a secondary image of objects which may serve as references to determine the direction of observation. This secondary image is captured by the set of photodetectors. It is distinct from the principal image formed by the rays selected by the principal pointing device, and which correspond to the direction of observation. The secondary image makes it possible to determine the direction of observation by virtue of the fact that the secondary pointing device is oriented fixedly with respect to the principal pointing device. The direction from which the rays forming the secondary image originate is therefore known as a function of the direction of observation of the optical system.

The light which is used to identify the direction of observation originates from objects external to the optical system, thereby rendering the system particularly simple. In particular, no supplementary light source is necessary.

The set of photodetectors may comprise a matrix of photodetectors, distributed along two perpendicular directions of a portion of flat photosensitive surface, for example.

Furthermore, the system is not very bulky because at least a part of the telescope participates simultaneously in the formation of the principal image corresponding to the direction of observation, and in the formation of the secondary image used to identify the direction of observation.

A system according to the invention is therefore particularly suitable for use on board a satellite, given that it is simple, lightweight, compact and is not energy greedy.

The secondary pointing device may be arranged in proximity to the principal pointing device or to the entrance of the telescope. The determination of the direction of observation is then not, or else only slightly, subject to an error caused by deformations or expansions of supports of the telescope and/or of the secondary pointing device.

Furthermore, the absence of moveable mechanisms between the principal pointing device and the secondary pointing device makes it possible to obtain greater accuracy in the determination of the direction of observation.

An advantage of an optical system according to the invention originates from the fact that the accuracy of determination of the direction of observation can be independent of the nature of the object sighted in the direction of observation. Specifically, the direction of observation can be determined simply on the basis of objects emitting light in a direction distinct from the direction of observation. Hence, it is thus possible to observe a dim or moving object such as, for example, clouds over the Earth seen from a satellite, while simultaneously benefiting from accurate determination of the direction of observation because the latter may be determined on the basis of light emitted by stars and directed toward the entrance of the telescope by the secondary pointing device.

The direction from which the rays directed by the secondary pointing device toward the entrance of the telescope originate and the direction of observation are preferably separated by a sufficient angle to avoid mutual disturbances between the principal and secondary images.

The secondary pointing device may comprise various optical elements such as, in particular, a prism or a plane mirror. A particularly simple and reliable embodiment is obtained when the secondary pointing device consists of a plane mirror oriented fixedly with respect to the principal pointing device. Furthermore, a prism as considered in the context of the invention may comprise a substantially transparent block provided with an entrance face, an exit face and one or more reflecting faces, and inside which light rays are reflected along a defined path between the entrance face and the exit face.

For an optical system carried on board a satellite, the optical system may be wholly fixed with respect to the platform of the satellite. The principal pointing device then consists of the principal pointing mirror and of the satellite orientation systems.

Alternatively, the principal pointing mirror may be moveable along two perpendicular axes. Such a system is suitable for performing a scan of the direction of observation, so as to cover a wide observation field.

Advantageously, a separating device is arranged inside the telescope so as to separate a beam of rays directed by the secondary pointing device toward the entrance of the telescope from a beam of rays selected by the principal pointing device. Such a separating device makes it possible to arrange easily, within the telescope, the set of photodetectors intended for capturing the secondary image, and another photodetection device for recording the image corresponding to the direction of observation.

According to an improvement of the invention, the optical system comprises two secondary pointing devices arranged ahead of the entrance of the telescope and each oriented fixedly with respect to the principal pointing device, so that rays directed by each of them toward the entrance of the telescope originate from separate respective directions. The set of photodetectors is then disposed so as to record two images, each formed by at least a part of the telescope from the light rays directed by one of the secondary pointing devices toward the entrance of the telescope. By implementing two secondary pointing devices in this way, in combination with the principal pointing device, it is possible to determine the direction of observation in three distinct angles with respect to an inertial reference benchmark. In this way, the direction of observation is fully determined in a unique manner.

Each of the two secondary pointing devices can comprise either a plane mirror or a prism for directing light rays originating from the corresponding secondary pointing direction toward the entrance of the telescope.

In the case where several secondary pointing devices are used, the set of photodetectors can comprise several matrices of photodetectors disposed so as to each record an image formed by at least a part of the telescope from the light rays directed by one of the secondary pointing devices toward the entrance of the telescope.

Preferably, the respective directions from which the rays directed by each of the secondary pointing devices toward the entrance of the telescope originate are separated by an angle of greater than 10 degrees. The direction of observation may then be determined in a particularly accurate manner.

The invention further proposes a method implementing an optical system as described previously. Such a method leads to particularly reliable results and interpretations by virtue, especially, of the accurate knowledge of the direction of the observations performed.

DETAILED DESCRIPTION OF THE INVENTION

Figure 1:
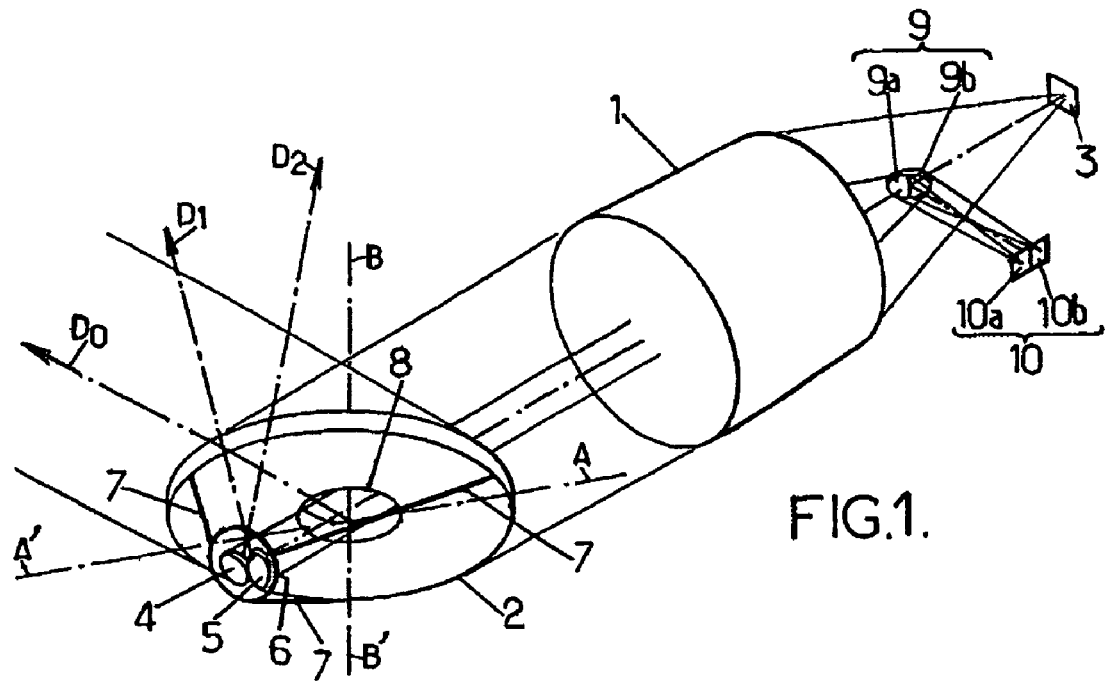
FIG. 1 represents an optical system according to the invention.
Figure 2:
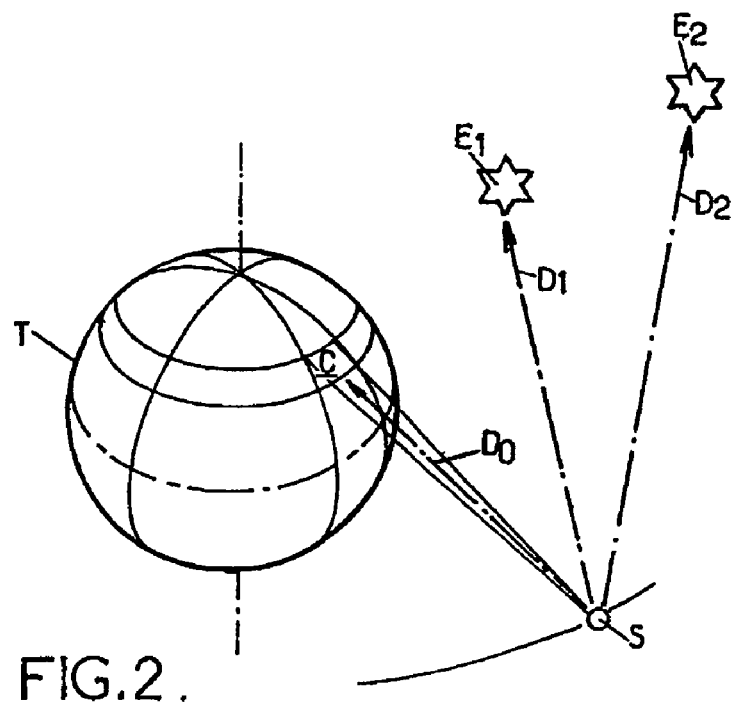
FIG. 2 illustrates a possible use of an optical system according to the invention.
Figure 4:
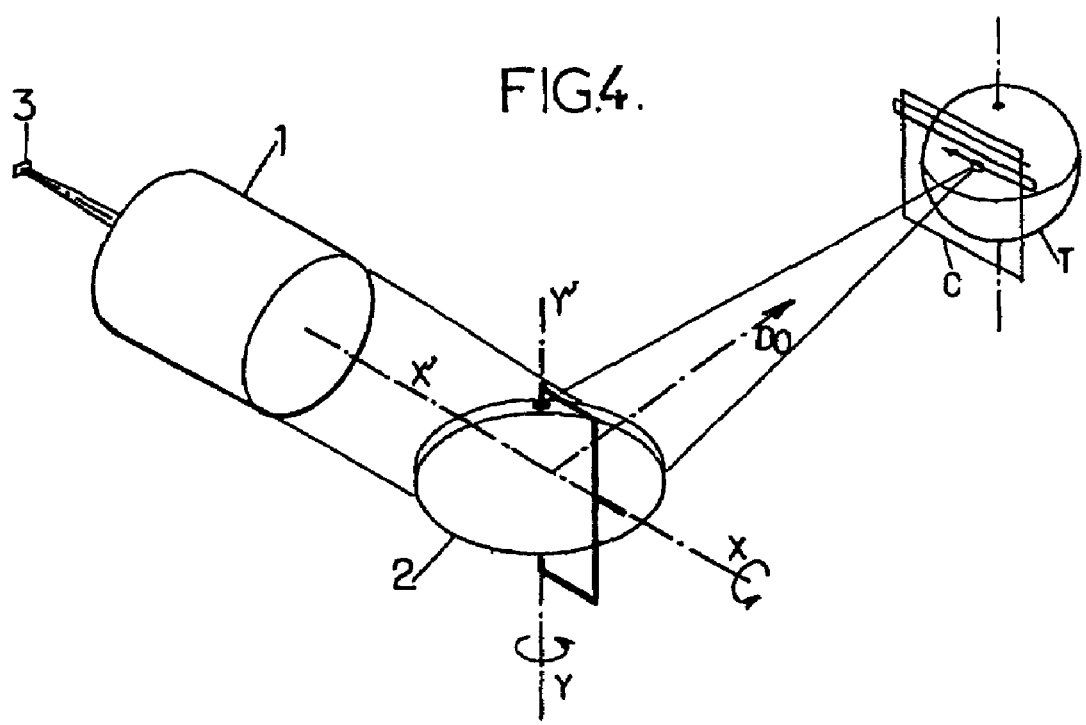
FIGS. 4 to 6 illustrate a scan carried out by means of an optical system according to the invention, within the context of the use of FIG. 2.

For the sake of clarity, the dimensions of the various elements represented in FIGS. 1, 2 and 4 do not correspond to actual dimensions. Furthermore, identical references used in different figures correspond to identical elements or ones having identical functions.

In accordance with FIG. 1, a telescope 1 is equipped at its entrance with a pointing device. The telescope 1 may be one of the types known to the person skilled in the art, for example of the type with two concave mirrors and one convex mirror. It is represented in a simplified manner in the form of a cylinder, but its actual configuration may be different, in particular when it is folded. Reference 3 denotes the focal plane of the telescope 1, at the exit of the latter.

The pointing device is of the type with an orientable mirror. It comprises a plane mirror 2 mounted on a support having two perpendicular axes, of a known type, not represented A-A' and B-B' indicate the two axes of orientation of the mirror 2, for a given position thereof. For this position, light lays originating from a direction $D_0$ are reflected by the mirror 2 toward the entrance of the telescope 1. These rays form an image in the focal plane 3. D sub 0 is called the direction of observation of the optical system, the mirror 2 is called the principal pointing minor and the corresponding image in the focal plane 3 is called the principal image.

Two secondary mirrors, referenced 4 and 5, are carried by a support 6 connected rigidly to the mirror 2. For example, the support 6 is held by three rods 7 fixed around the circumference of the mirror 2. The mirrors 4 and 5 are plane, and may be of small dimensions. Each of the mirrors 4 and 5 reflects light originating from a secondary direction toward the entrance of the telescope 1. Thus, $D_1$ is the direction from which the light rays entering the telescope 1 after having been reflected by the mirror 4 originate, and $D_2$ is the direction from which the light rays entering the telescope 1 after having been reflected by the mirror 5 originate. The mirrors 4 and 5 constitute two secondary pointing systems, whose respective directions of pointing are $D_1$ and $D_2$. $D_1$ and $D_2$ are called the secondary directions of pointing. On account of the rigid connection between the mirror 2 on the one hand, and each of the mirrors 4 and 5 on the other hand, the directions $D_1$ and $D_2$ are distinct from the direction $D_0$, but retain constant respective orientations with respect to $D_0$ when the mirror 2 is turned about the axes A-A' and/or B-B'. By way of example, $D_1$ and $D_2$ each form an angle of 90° with $D_0$ and form an angle of 60° with each other.

According to a simple and compact arrangement, the mirror 2 may have an aperture, and each secondary pointing device is arranged so that the rays directed by this secondary pointing device toward the entrance of the telescope pass through the said aperture. Thus, in the system illustrated, the mirror 2 possesses a central aperture 8 and the beams of light rays reflected by each of the mirrors 4 and 5 pass through the aperture 8 before entering the telescope 1.

In order to reduce the drop in brightness of the principal image due to the aperture 8, the two mirrors 4 and 5 may be adjacent each other on the support 6. The aperture 8 may then be of relatively small size, yet permitting the passage of the light beams reflected respectively by the mirrors 4 and 5. The layout of the aperture 8 in a central part of the mirror 2 is not essential, but it contributes to further reducing the drop in brightness of the principal image.

A separating device 9 is arranged inside the telescope 1 on the path of the light rays reflected by the mirrors 4 and 5. It is arranged at an intermediate pupil of the optical system, which may, for example, be an image of the aperture 8 through a part of the telescope 1. The separating device 9 is preferably fixed with respect to the telescope 1. It is of suitable dimensions for deviating the beams of rays emanating from the mirrors 4 and 5 regardless of the orientation of the mirror 2, while diverting as little as possible part of the light reflected by the mirror 2. In the particular embodiment described here, the separating device 9 is composed of two contiguous separating mirrors, referenced 9a and 9b. The separating mirror 9a is disposed so as to reflect the beam of rays emanating from the secondary mirror 4, and the separating mirror 9b is disposed so as to reflect the beam of rays emanating from the secondary mirror 5.

Two matrices of photodetectors 10a and 10b are placed in respective image planes conjugated with the focal plane 3 by the separating device 9. They constitute the set of photodetectors 10. They are arranged so as to receive the beams of rays reflected by the separating mirrors 9a and 9b, respectively. Optionally, further optical elements may be interposed between the separating device 9 and the matrices 10a and 10b, especially so as to adapt the aperture of the light beams, for compactness reasons, or to improve the resolution of image acquisition by the matrices 10a and 10b.

The matrices of photodetectors 10a and 10b consequently capture respective images which each correspond to one of the secondary pointing directions $D_1$ and $D_2$. They may be sensitive to visible light and/or infrared light.

The optical system may furthermore comprise a principal pointing device control unit (not represented in FIG. 1) adapted for carrying out a scan of the direction of observation $D_0$ Such a unit may comprise two motors, for example of the stepper type, connected to the mirror 2 so as to turn the latter respectively about the axes A-A' and B-B'.

Alternatively, the control unit can operate the motors so as to acquire separate images each corresponding to a given direction of observation $D_0$.

In accordance with FIG. 2, such an optical system may be used for terrestrial observation performed from a satellite. T denotes the Earth and the reference S refers to the satellite as a whole. The satellite S may be geostationary, dedicated to meteorological observation for example. The mirror 2 is oriented in such a way that the direction of observation $D_0$ points toward a particular location on the surface of the Earth, where the meteorological observation is to be performed. The image formed in the focal plane 3 then corresponds to a portion of the surface of the Earth, referenced C in FIG. 2.

The image recorded by each matrix of photodetectors 10a, 10b then comprises image points conjugated with stars. These stars, referenced $E_1$ and $E_2$ in FIG. 2, are situated in the directions $D_1$ and $D_2$ with respect to the satellite S. For the purposes of terrestrial or meteorological observation, these stars constitute fixed reference marks making it possible to define an inertial reference benchmark.

When a scan of a portion of the surface of the Earth is carried out by controlling a progressive variation of the direction of observation $D_0$, the directions $D_1$ and $D_2$ simultaneously sweep through a scan of a portion of the sky. Stated otherwise, when a scan of $D_0$ is performed with respect to the inertial reference benchmark, the secondary directions of pointing $D_1$ and $D_2$ each vary by following the movements of $D_0$. The matrices 10a and 10b then capture images which each correspond to a track described in the sky by the direction $D_1$ or by the direction $D_2$.

In the particular case of a scan of $D_0$ parallel to the direction of the equator, one of the directions $D_1$ or $D_2$ can remain fixed with respect to the inertial reference benchmark when this secondary pointing direction is parallel to the terrestrial rotation axis. One is in fact dealing with a scan of this secondary pointing direction which is reduced to a rotation of the direction about itself. The images captured successively by the corresponding matrix of photodetectors are then deduced from one another by rotation.

According to a preferred mode of implementation, at least one portion of image recorded by the set of photodetectors is compared with a reference image. A result of the comparison can then be used in different ways. For example, it can be used to modify a bias of the telescope and/or an attitude of the satellite, or to correct and/or locate an observation image obtained from the rays selected by the principal pointing device.

In a particularly advantageous manner, the result of the comparison is used to modify a setting of the principal pointing device. Thus, the direction of observation $D_0$ is adjusted as a function of the secondary images obtained along the directions $D_1$ and $D_2$.

To this end, the optical system furthermore comprises a device for comparing an image recorded by the set of photodetectors 10 with a reference image. It also comprises a slaving device (not represented) for feedback control of the principal pointing device as a function of a result of the comparison.

Figure 3:
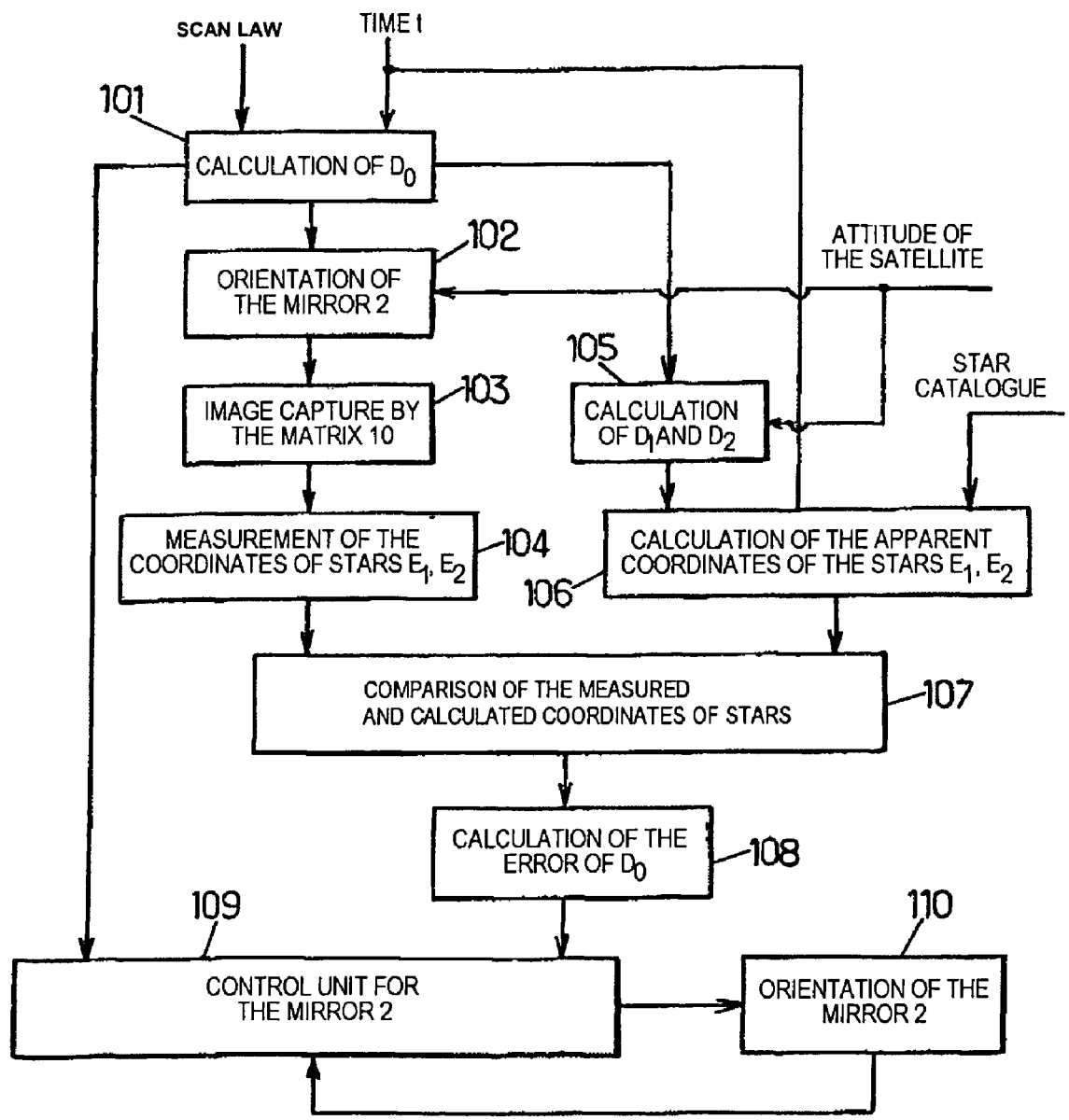
FIG. 3 is a functional diagram of an improvement of an optical system in accordance with FIG. 1.

FIG. 3 is a simplified operating diagram of such a mode of setting of the orientation of the mirror 2. During a first step 101, initial coordinates of the direction of observation $D_0$ are calculated on the basis of a recorded scan law and of a time coordinate denoted t. An orientation of the mirror 2 is then calculated on the basis of the current attitude of the satellite S, so as to point in the direction $D_0$ whose coordinates have been calculated. The mirror 2 is then turned until this orientation is obtained (step 102) and then the matrices of photodetectors 10a and 10b are activated so as to capture the images formed on their surfaces by the rays reflected by the mirrors 4 and 5 (step 103). Coordinates of stars $E_1$ and $E_2$, or of groups of stars, are then measured on the images captured (step 104).

In parallel, coordinates of the directions $D_1$ and $D_2$ are calculated on the basis of the coordinates of the direction $D_0$ that were determined in step 101 and of attitude data of the satellite S (step 105). Apparent coordinates of the stars $E_1$ and $E_2$ are then determined, using a catalogue of stars identified by their positions, the instant of capture of images of step 103, and the calculated coordinates of the directions $D_1$ and $D_2$ (step 106). These calculated apparent coordinates are compared with the corresponding coordinates measured on the images captured (step 107). A pointing error is then deduced from differences between the apparent coordinates measured and calculated for the stars $E_1$ and $E_2$ (step 108).

This pointing error is then transmitted to the control unit of the mirror 2, which unit is referenced 109 in FIG. 3, at the same time as the calculated coordinates of the direction $D_0$. It is then introduced into the feedback loop which makes it possible to control the orientation of the mirror 2, while being combined with data provided by sensors sensing the position of the mirror 2. The pointing error is thus automatically compensated for during the orientation of the mirror 2 carried out in step 110. However, this compensation may be limited by the accuracy of the secondary pointing systems, as well as by the response times of the secondary pointing devices, the device for comparing images and the device for slaving the principal mirror.

According to this mode of setting of the mirror 2, the device for comparing the secondary images captured by the matrices 10a and 10b is integrated upstream of the device for slaving the position of the mirror 2.

When an isolated picture is to be taken by recording a principal image formed in the focal plane 3, this image is recorded once the slaving loop of steps 109 and 110 has converged and once a definitive orientation of the mirror 2 has been reached.

When a scan is to be carried out, the mirror 2 adopts progressively offset successive positions. It is then possible to determine the pointing error during a first position of the mirror 2, in which a first principal image is captured, and to use this pointing error to adjust a second position of the mirror 2, during which a second principal image is captured. Steps 102 and 110 of the diagram of FIG. 3 then correspond to two successive positions of the mirror 2 during the scan, each being associated with a captured principal image.

Figure 5:
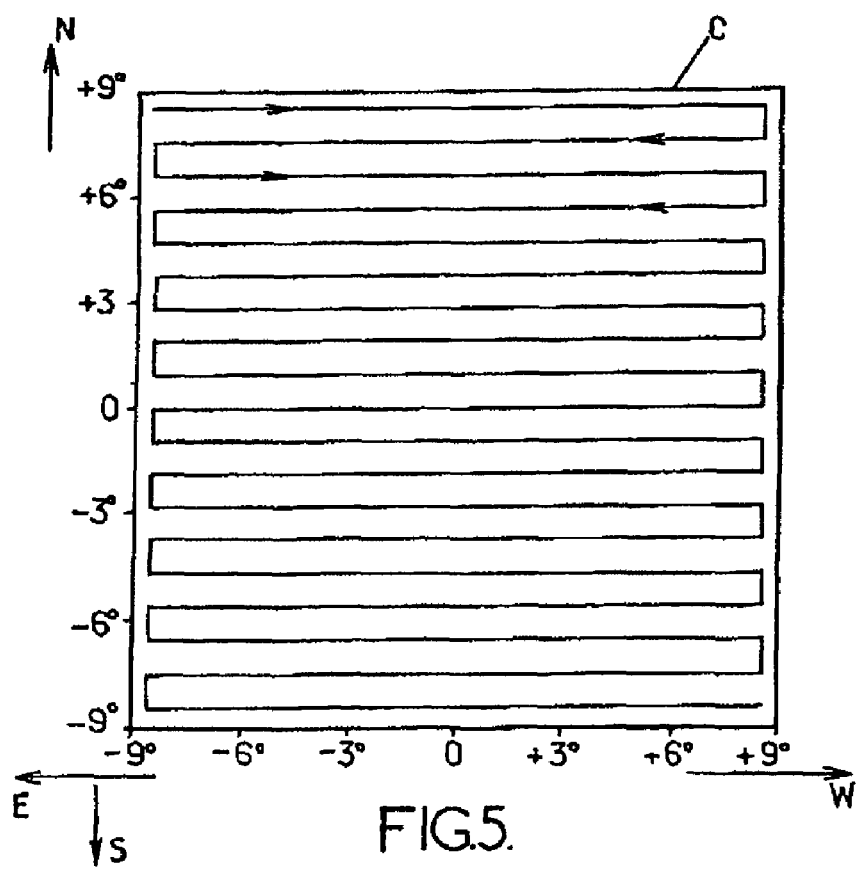

FIG. 4 illustrates a particular configuration of the principal pointing device, which configuration is adapted to perform a scan, via the principal pointing direction $D_0$, of a portion C of the surface of the Earth along lines parallel to the equator and offset in the direction of the local meridian. For the sake of clarity in FIG. 4, the secondary pointing devices 4 and 5 are not reproduced. The principal mirror 2 may be turned about a principal axis X'-X parallel to the optical axis of the telescope 1, and about a secondary axis Y'-Y perpendicular to the axis X'-X. Thus, a line of the scan is obtained by progressive rotation of the mirror 2 around the axis Y'-Y, and the switch from one line to the next is obtained by rotation around the axis X'-X. The resulting scan is represented in FIG. 5. The portion C corresponds to variations of −9° to −90° of the direction $D_0$ in the East-West directions (denoted E and W in the figure) and South-North (denoted S and N), with respect to a central point.

Figure 6:
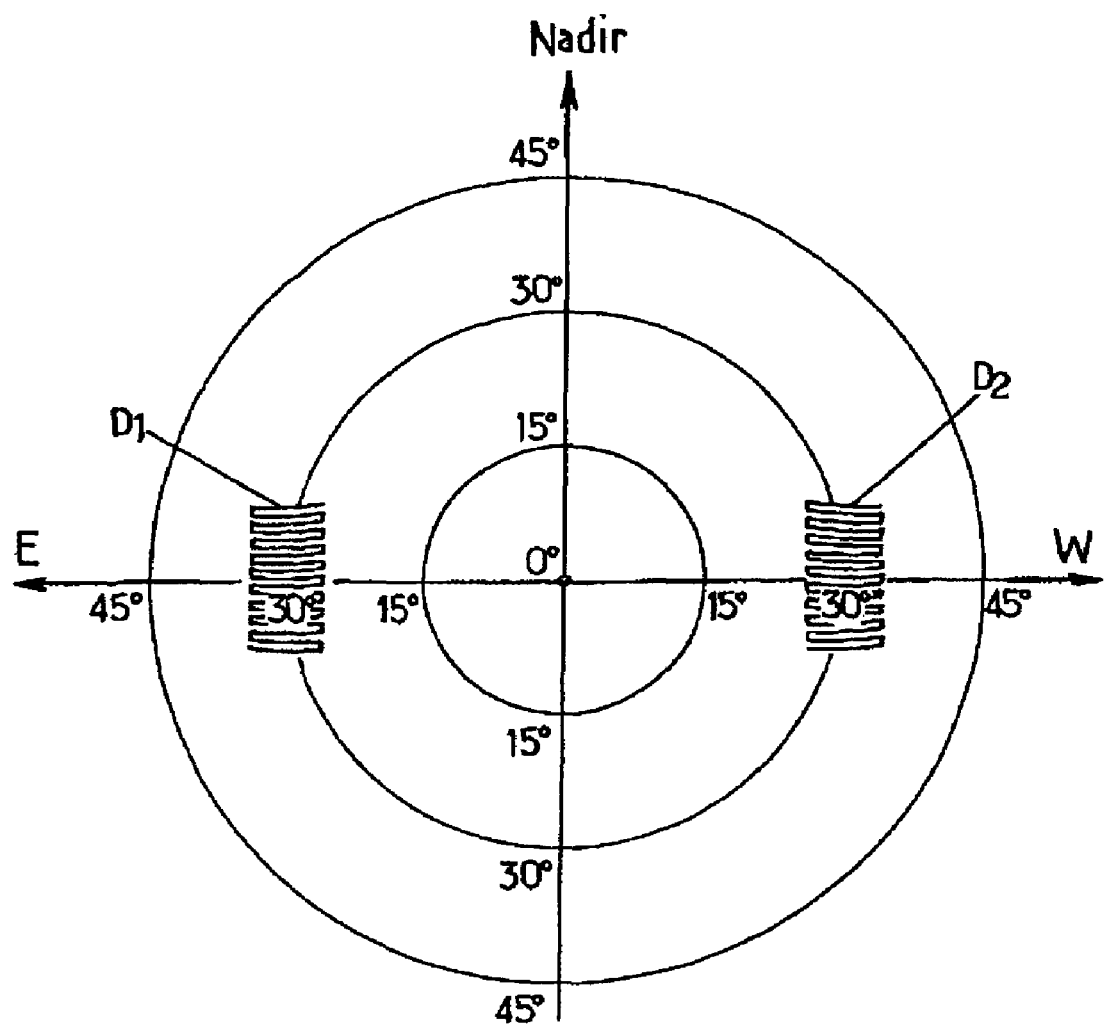

FIG. 6 illustrates the scans described by the directions $D_1$ and $D_2$ for two secondary pointing systems similar to those described in conjunction with FIG. 1. It corresponds to a projection of the celestial canopy in the terrestrial equatorial plane. The vertical axis is oriented toward the nadir, and the horizontal axis is oriented from east to west. It is assumed that the two directions $D_1$ and $D_2$ point in an approximately symmetric manner either side of the direction of north, corresponding to the intersection of the two axes, respectively eastward and westward. The tracks represented for $D_1$ and $D_2$ in FIG. 6 correspond to the track of $D_0$ represented in FIG. 5.

It is understood that numerous modifications may be introduced into the mode of deployment described in detail with reference to FIG. 1. Among them may be mentioned in particular the following modifications:

the principal mirror 2 has no aperture 8 and the secondary mirrors 4 and 5 are arranged in such a way that the light rays reflected by each of them toward the entrance of the telescope 1 pass outside the periphery of the mirror 2. Such a configuration of the principal pointing device and secondary pointing devices is less compact than that described in detail but causes no drop in brightness of the principal image. In particular, the secondary mirrors may be fixed to the periphery of the principal mirror;

each secondary mirror 4, 5 may be replaced with a prism, which may make it possible, in particular, to obtain different relative positions of the secondary pointing directions $D_1$ and $D_2$ with respect to the direction of observation $D_0$;

the separating device 9 consists of a single mirror disposed so as to reflect all the beams of rays emanating from the secondary pointing devices;

the two matrices of photodetectors 10a and 10b may be replaced with a single matrix, in particular when the separating device 9 consists of a single mirror. In this case, the single matrix of photodetectors captures a composite image formed by the juxtaposition of two portions of images corresponding respectively to the secondary pointing directions $D_1$ and $D_2$. The two portions of images may be separated by computer processing, in particular as a function of the rate of displacement of each point of the composite image between two successive recordings; and the optical system may comprise an even or odd number of secondary pointing devices depending on the type of scan envisaged. In practice this number is two or three secondary pointing devices. A separate separating mirror and a separate matrix of photodetectors may then be associated with each secondary pointing device.

Finally, the invention is not limited to the application of terrestrial observation which has been described. It may also be used for other applications, such as, in particular, charting of celestial objects or orientation of an optical transmission terminal incorporating a telescope.

The method of adjusting the direction of observation corresponding to FIG. 3 may then be adapted as a function of particular constraints fixed by the application concerned.

The invention claimed is:

1. An optical system with variable pointing comprising:
    a telescope;
    a principal pointing device making it possible to select light rays originating from a particular direction of observation to enter the telescope, the principal pointing device comprising a principal pointing minor, arranged ahead of the entrance of the telescope and orientable, and the direction of observation being selected by orienting the principal pointing mirror so as to reflect light rays originating from the direction of observation toward the entrance of the telescope;
    at least one secondary pointing device arranged ahead of a part of the entrance of the telescope and oriented fixedly with respect to the principal pointing device, the secondary pointing device furthermore being oriented so that rays directed by the secondary pointing device toward the entrance of the telescope originate from a direction distinct from said direction of observation, the principal and at least one secondary pointing devices being external to the telescope; and
    at least one set of photodetectors arranged so as to record an image formed by at least a part of the telescope from light rays directed by the secondary pointing device toward the entrance of the telescope,
    wherein the secondary pointing device is rigidly coupled to the principal pointing mirror so as to follow said principal pointing mirror during a change in the direction of observation.

2. The system according to claim 1, wherein the secondary pointing device comprises a plane mirror.

3. The system according to claim 1, wherein the secondary pointing device comprises a prism.

4. The system according to claim 1, wherein the principal pointing minor has an aperture, and wherein the secondary pointing device is arranged so that the rays directed by said secondary pointing device toward the entrance of the telescope pass through said aperture.

5. The system according to claim 1, comprising two secondary pointing devices arranged ahead of the entrance of the telescope and each oriented fixedly with respect to the principal pointing device, so that rays directed by each of the secondary pointing devices toward the entrance of the telescope originate from separate respective directions, the set of photodetectors being arranged so as to record two images, each formed by at least a part of the telescope from the light rays directed by one of the secondary pointing devices toward the entrance of the telescope.

6. The system according to claim 5, wherein the respective directions from which the rays directed by each of the secondary pointing devices toward the entrance of the telescope originate are separated by an angle of greater than 10 degrees.

7. The system according to claim 5, wherein each secondary pointing device comprises a plane mirror, and wherein the two mirrors of the secondary pointing devices are adjacent each other.

8. The system according to claim 5, wherein each secondary pointing device comprises a prism, and in which the two prisms of the secondary pointing devices are adjacent each other.

9. The system according to claim 5, wherein the set of photodetectors comprises two matrices of photodetectors arranged so as to each record an image formed by at least a part of the telescope on the basis of the light rays. directed by one of the two secondary pointing devices toward the entrance of the telescope.

10. The system according to claim 1, furthermore comprising a principal pointing device control unit adapted so as to perform a scan of the direction of observation.

11. A method for determining the direction of observation of the optical system according to claim 1 comprising:
reflecting light rays originated born the direction of observation towards the entrance of the telescope by the principal pointing device;
directing light rays originated from a direction distinct from said direction of observation to enter the telescope by the secondary pointing device; and
recording an image formed by at least a part of the telescope from light rays directed by the secondary pointing device toward the entrance of the telescope.

12. The method according to claim 11, used for a terrestrial observation performed from a satellite, and wherein the image recorded by the set of photodetectors comprises image points conjugated with stars.

13. The method according to claim 12, wherein the satellite is geostationary.

14. The method according to claim 12, wherein the optical system furthermore comprises a principal pointing device control unit adapted so as to perform scan of the direction of observation, wherein a scan of a portion of the surface of the Earth is carried out by controlling a progressive variation of the direction of observation, and wherein the directions from which the rays directed by each secondary pointing device toward the entrance of the telescope originate sweep simultaneously through a scan of a portion of the sky.

15. The method according to claim 11, wherein at least one image portion recorded by the set of photodetectors is compared with a reference image.

16. The method according to claim 15, wherein a result of the comparison is used to modify a setting of the principal pointing device.

17. An optical system with variable pointing comprising:
a telescope;
a principal pointing device making it possible to select light rays originating from a particular direction of observation to enter the telescope, the principal pointing device comprising a principal pointing mirror, arranged ahead of the entrance of the telescope and orientable, and the direction of observation being selected by orienting the principal pointing mirror so as to reflect light rays originating from the direction of observation toward the entrance of the telescope;
at least one secondary pointing device arranged ahead of a part of the entrance of the telescope and oriented fixedly with respect to the principal pointing device, the secondary pointing device furthermore being oriented so that rays directed by the secondary pointing device toward the entrance of the telescope originate from a direction distinct from said direction of observation;
a separating device arranged inside the telescope so as to separate a beam of rays directed by the secondary pointing device toward the entrance of the telescope from a beam of rays selected by the principal pointing device; and
at least one set of photodetectors arranged so as to record an image formed by at least a part of the telescope from light rays directed by the secondary pointing device toward the entrance of the telescope,
wherein the secondary pointing device is rigidly coupled to the principal pointing mirror so as to follow said principal pointing mirror during a change in the direction of observation.

18. An optical system with variable pointing comprising:
a telescope;
a principal pointing device making it possible to select light rays originating from a particular direction of observation to enter the telescope, the principal pointing device comprising a principal pointing mirror, arranged ahead of the entrance of the telescope and orientable, and the direction of observation being selected by orienting the principal pointing mirror so as to reflect light rays originating from the direction of observation toward the entrance of the telescope;
at least one secondary pointing device arranged ahead of a part of the entrance of the telescope and oriented fixedly with respect to the principal pointing device, the secondary pointing device furthermore being oriented so that rays directed by the secondary pointing device toward the entrance of the telescope originate born a direction distinct from said direction of observation;
at least one set of photodetectors arranged so as to record an image formed by at least a part of the telescope born light rays directed by the secondary pointing device toward the entrance of the telescope; and
a device for comparing the image recorded by the set of photodetectors with a reference image, and comprising a device for slaving the principal pointing device as a function of a result of said comparison,
wherein the secondary pointing device is rigidly coupled to the principal pointing mirror so as to follow said principal pointing minor during a change in the direction of observation.

* * * * *

UNITED STATES PATENT AND TRADEMARK OFFICE
CERTIFICATE OF CORRECTION

PATENT NO. : 7,385,759 B2  Page 1 of 1
APPLICATION NO. : 11/245461
DATED : June 10, 2008
INVENTOR(S) : Federick Pasternak et al.

It is certified that error appears in the above-identified patent and that said Letters Patent is hereby corrected as shown below:

On column 9, line 31 claim 11: please replace "born" with --from--

On column 9, line 48 claim 14: please insert --a-- between "perform scan"

On column 10, line 47 claim 18: please replace "born" with --from--

On column 10, line 50 claim 18: please replace "born" with --from--

Signed and Sealed this

Second Day of June, 2009

JOHN DOLL
*Acting Director of the United States Patent and Trademark Office*